Patented Dec. 16, 1941

2,266,646

UNITED STATES PATENT OFFICE 2,266,646

METHOD OF MAKING CERAMIC PRODUCTS

Donald E. Lower, Lansdale, Pa.

No Drawing. Application December 5, 1938,
Serial No. 244,075

16 Claims. (Cl. 25—156)

The invention, generally considered, relates to a novel method by which ceramic products can be made.

The primary object of the invention is to provide a ceramic body which, on firing, will acquire a glazed or vitrified surface without necessitating the application of a special glazing material to the body.

Another object of the invention is to provide a method of making ceramic bodies whereby by adding a soluble salt such as a phosphate to a mixture of ceramic materials from which a body is to be prepared, a uniform glaze or vitrified coating is obtained on the surface of the body after it has been fired.

Still another object of the invention is to provide a method of making a glazed ceramic body, whereby the presence of a soluble phosphate in the ceramic body will produce a glazed surface on firing at a lower temperature than that required to vitrify the entire body, the warping and keystoning which normally occur during the firing of ceramic bodies to vitrification and the impairing of the size and shape of the finished product being thus avoided.

A further object of the invention is to provide a method of making ceramic products having glazed surfaces consisting in firing ceramic materials to which has been added a soluble phosphate by which the possibility of crazing or shivering of the glaze, caused by the difficulty in preparing a special glazing material having substantially the same coefficient of expansion as the ceramic body to which it is to be applied, is materially decreased; the relatively low firing temperature at which the glaze is obtained further decreasing that possibility.

A still further object of the invention is to provide a method of making ceramic products whereby the colors of any of the ingredients of the product which have inherent color characteristics will not unite and destroy each other, but will be separately intensified on the firing of the body and by which certain colors can be produced in the finished product, either by use of selected ceramic materials having the desired color characteristics, or by the addition to the ceramic materials of inorganic coloring agents.

An additional object of the invention is to provide a method of making ceramic bodies having glazed surfaces without the application of a special glazing material to the surface of the body, whereby the glaze can be limited to one or more surfaces, or portions of a surface, of the body, as desired.

Other and further objects will appear hereinafter in the detailed description of the invention and be particularly pointed out in the appended claims.

In the manufacture of ceramic articles having a glazed or vitrified surface coating, it has heretofore been the practice to coat the articles, before they are fired, with a glazing mixture or compound. On firing this mixture will become vitrified and the requisite glaze thus be obtained. The selection of materials for the glazing mixture is dependent to a large degree upon the type of glaze desired as the types differ for the various kinds of ceramic products, such as tiles and porcelains. However, certain factors, determinative of the relative proportions of the materials in the mix, as well as of the materials used, must be considered irrespective of the branch of the ceramic industry involved.

When ceramic articles, to which a glazing material has been applied, are subjected to heat on firing and subsequently cooled, it is normally to be expected that the glaze and the body of the article, being of different composition, will expand and contract differently. If the two were of substantially the same strength, bending or distortion of the article would result. However, the coating of glazing mixture is so thin, compared with the body, that the only apparent effect is in the glaze. The resultant cracking of the glaze is known as "crazing" if caused by over-contraction of the glaze, and shivering, if due to under-contraction. Accordingly, it is essential that the composition of the body and the glazing mixture be so controlled that a neutral glaze, one having substantially the same coefficient of expansion as the body throughout the range of temperatures encountered during the firing, will be obtained.

Since crazing and shivering of the glaze is caused by the firing and subsequent cooling of a ceramic body coated with a glazing mixture whose coefficient of expansion differs from that of the body, it is apparent that if some means can be evolved for forming a glaze, which will render unnecessary the coating of the body with a glazing mixture of different composition, the cracking of the glaze will be practically eliminated. It is with such a means that the present invention is concerned.

Essentially, the invention consists in adding to and mixing with, ceramic materials a soluble salt such as a phosphate. After ceramic bodies of the desired shapes have been formed from the mixed mass they are dried and then fired. By this method, a glazed ceramic body is produced without application of a glazing mixture to the surface of the body. As the components of the body are thoroughly mixed into a homogeneous mass, the coefficients of expansion of body and glaze are substantially the same and the cracking of the glaze is thereby avoided.

The use of phosphates is not broadly new to the ceramic industry as one of the principal constituents of bone china is calcined bone ash or calcium phosphate, $Ca_3(PO_4)_2$. In addition, calcium phosphate has been used in a glazing mixture to form an opaque glaze as it is suspended in the glaze on firing, thus destroying the transparency of the glaze. Calcium phosphate has also been used as a flux and along with iron phosphate, $Fe_3(PO_4)_2$ as a bond for raw glaze. However, in each of these instances the per cent of phosphate in the mixture is high, between six per cent (6%) and fifty per cent (50%) of the total mass. More important, both calcium and iron phosphates are insoluble which does not interfere with their action in the above uses and is often desirable as in an opaque glaze, but prevents their use in the present process in which solubility of the phosphate is essential to the formation of the glaze.

In the preferred method or process of carrying out the invention, the clays and other ingredients which it is desired that the ceramic body shall contain, are placed relatively dry in a muller or other suitable device and thoroughly mixed. A soluble phosphate dissolved in water is then added gradually to the batch, the mixing operation being continued during the addition, until a homogeneous mass of the desired phosphate percentage and moisture content is obtained. In the alternative, the phosphate can be mixed with the ceramic material before the addition of the water, as in either case, it will be dissolved by the water. The mixed materials are then removed from the mixing machine, pulverized and screened, and formed into the desired shapes by molding, pressing, or other like means. After being formed, the ceramic body is dried and then fired at the temperature and for the time required to produce the glaze. It may be found that the raw materials are too coarse to be dry mixed and, in that event, it will be necessary to grind them either separately or together in a pulverizer, prior to the mixing operation.

The advantage of the dry mixing method is that the moisture content of the mixture can be rigidly controlled and removal of excess fluid is thereby avoided. However, such control is not essential and if desired other methods or processes, by which the requisite mixing, forming and firing are obtained, such as the plastic, semi-plastic, and dry press processes, can be used almost as effectively. In the plastic process the materials together with the phosphate and water necessary to form a plastic mass are thoroughly mixed in a pug mill, wet pan or dry mixer. The mass is then extruded or expelled and formed into the desired shapes, dried, and fired. In the semi-plastic process the materials together with the phosphate and water necessary to form a semi-plastic mass are thoroughly mixed in a wet pan or dry mixer. The mass is then expelled and pulverized, then formed into the desired shapes, dried and fired. In the dry press process the materials are mixed in a pug mill, wet pan or dry mixer, as in the plastic process, but after mixing, the pugged or mulled mass is dried to the desired moisture content and ground to sufficient fineness to pass approximately a sixteen mesh screen. It is then pressed into the desired shapes and fired. In all processes any necessary pulverizing, prior to the mixing, can be accomplished either in a ball mill or by wet pan, dry pan or pulverizer. Air floated materials can also be used, which eliminates pulverizing. It is also practical in all processes to blunge the tough ball clay into a slip containing ball clay and water or ball clay, soluble phosphate and water, then adding this slip to the dry materials in the mixer, wet pan or pug mill. This eliminates pulverizing of the coarse, tough ball clay before mixing. The desired amount of ball clay and moisture can be accurately controlled by the specific gravity of the slip.

By whatever method or process the ceramic body having a glazed or vitrified surface is prepared, the ceramic batch or mass, from which the body is formed, can be made up of a mixture of the materials normally used in making ceramic products or natural clays containing impurities can be availed of. The materials normally used are ball and china clays, to which are added flint, feldspar and talc; the feldspar and talc acting as fluxes as does the flint in combination with either feldspar or talc to increase the fusibility of the batch. Natural clays usually contain as impurities potassium, sodium, calcium, magnesium and iron, which impurities act as fluxes, thereby permitting a decrease in the percentages of feldspar and talc in the ceramic mixture without excessive change in its fusibility.

The phosphates which are added to the ceramic mix can be of any metal with which the phosphate radical combines to form a soluble compound. Included among these soluble compounds are alkali phosphates and acid phosphates of the alkali metals. Alkaline phosphates are generally insoluble and it is, therefore, necessary that at least one hydrogen atom be present in the compound of the phosphate radical and the alkaline metal to render it soluble.

Only soluble phosphates are available for use in the present process as on the solubility of the phosphate is dependent the formation of a glazed or vitrified surface. When mixed with ceramic materials, the phosphate dissolved in water, permeates or is thoroughly diffused through and coats each particle of the ceramic mass. On subsequent drying, a large portion of the phosphate solution is driven to the surface of the ceramic body where the water evaporates, leaving a surface coating of the phosphate. Since phosphates are more readily fusible than the other constituents of the mix, the surface will vitrify at a lower temperature than the remainder of the body and the desired glaze will be obtained. If an insoluble phosphate were used, it would not be driven to the surface dissolved in water. The portion of the phosphate solution which is not driven to the surface of the ceramic body but remains permeated throughout the mass of the body is not wasted. As in the formation of the glaze, the greater fusibility of the phosphate causes surface fusion between the particles in the mass without fusion of the bodies of the particles and resultant destruction of their individuality.

The amount of soluble phosphate which it is necessary to add to the mix to form a craze-proof glaze is relatively small, varying between one-half of one per cent (0.5%) and three per cent (3%) by weight of the total mix. If present in the mix in excess of three per cent (3%), it has been found that an over-abundance of phosphate is deposited on the surface of the body and the glaze has a tendency to craze. The percentage of phosphate added to a particular mix is dependent upon the percentage of fluxes in the mix and the temperature at which the body, formed from the mix, is to be fired. Since both fluxes and phosphates lower the vitrification temperature of the ceramic body, the former by chemical reaction with the siliceous materials in the body to form more fusible multiple silicates, and the latter by providing a coating having a lower vitrification temperature over both the body and the particles of matter constituting the body and possibly reacting to form some multiple silicates, the percentage of phosphate in the mix will, within limits, vary inversely with the percentage of fluxes. In like manner, decrease in the firing temperature to which the body is subjected, other factors remaining constant, necessitates the introduction of a greater amount of phosphate into the body. If it is not desired to produce a ceramic body having a completely vitrified surface, the degree of vitrification can be controlled by changing the amount of either the phosphate or the fluxes in the body.

A normal ceramic mixture containing the following percentages, by weight, of its various constituents to which has been added between one (1) and two (2) per cent by weight of a soluble phosphate, preferably one per cent (1%), and which is fired at a temperature between cones 3 and 5, has been found to produce very satisfactory results:

|  | Per cent |
|---|---|
| Ball clay | 12 |
| China clay | 20 |
| Flint | 20 |
| Feldspar | 43 |
| Talc | 5 |
|  | 100 |

If natural clays, containing impurities which act as fluxes, are used, the percentage of clay in the mixture can be increased to fifty per cent (50%) or more, with a corresponding decrease in flint, feldspar, and talc. In this case, it may prove desirable to increase the amount of soluble phosphate to between two per cent (2%) and three per cent (3%), by weight, of the mixture to insure formation of a glaze because of the possible inactivity of some of the impurities as fluxes.

The total amount of water added to the mixture will depend upon the method or process by which the ceramic body is prepared, those processes which entail pugging, necessitating the use of a larger amount of water to insure thorough commingling of the ceramic materials. It is of course essential that in all processes there be enough water present to give the mass the plasticity required to permit it to be handled and formed into the desired shapes. Finally, the quantity of water added with the phosphate will vary with the amount and solubility of the phosphate, sufficient being necessary to dissolve the phosphate.

It is often undesirable that a glaze be formed over the entire surface of a ceramic body. Certain ceramic products, particularly tiles, bricks, and the like, are embedded in walls and floors and have only one exposed face or surface. In these products, the exposed surface alone should be glazed, since not only does the appearance not require glazing of the embedded surfaces, but the cement or mortar, by which the tile is held in place, adheres much more readily to an unglazed than to a glazed surface. The glaze of the present invention is obtained by the evaporation of water from the phosphate solution which deposits a coating of phosphate on the surface of the body and if the evaporation of water from a particular surface is prevented, the formation of a glaze on that surface is precluded. As the evaporation of water from the solution is dependent upon its access to the air, any means by which such access can be avoided will prevent the evaporation. This can be accomplished by covering a particular surface, either by so arranging the stacked bodies that each will contact or abut the corresponding surface of another body, or by other suitable means. The covering of the surface, or surfaces, during drying of the body, has proved sufficient, although it may be found desirable to retain the covering during the firing of the body to insure the absence of a glaze.

The invention particularly lends itself to the production of vari-colored ceramic products. As has heretofore been explained, the phosphate solution coats each individual particle of the ceramic materials, with which it is mixed, producing, on firing, fusion only of the surfaces of the particles. It is thus evident that if different types of ceramic materials are mixed together, their individuality will not be destroyed by fusion of the entire mass and, by judicious selection of materials having inherent color characteristics, the colors remain separate and distinct and are not blended when the body is fired, producing a vari-colored ceramic body. If the desired colors are not inherent in the available ceramic materials, inorganic coloring agents of the type set out in my patent on a Method of making vitrified products, No. 2,138,870, granted December 6, 1938, can be mixed with part of the ceramic materials before they are mixed together and the same effect produced.

It may also be considered desirable to produce a ceramic body of both bright and dull colors, or of bright speckles of color in a dull colored or uncolored background. As the accentuation and brightness of the colors is dependent upon the formation of a glaze, such bodies can be prepared by mixing the phosphate with only that portion of the materials in the body which it is desired shall be bright on firing. As the phosphate is soluble, the presence of excess water in the mixture would dissolve the phosphate and diffuse it throughout the entire mixture. It is, therefore, necessary to mix the material to which the phosphate is added separate from the remainder of the materials, adding merely sufficient water to each mixture to provide for the plasticity necessary for forming, or if excess water is practically unavoidable, the excess must be removed before all the materials are mixed together. By this means, the particles of matter containing phosphate are glazed and bright on firing while the balance of the body remains dull.

One other aspect of the present invention should be considered. Heretofore one of the major problems of manufacturers of ceramic products has been the warping and keystoning of ceramic bodies on firing, inhibiting the production of bodies of uniform size and shape. Warping and keystoning are caused by the flowing of the complex silicates which comprise a large part of the ceramic mass at temperatures near their vitrification temperature. In the instant case, the formation of the glaze and the fusion between the particles of matter in the body are caused by the vitrification of the phosphate with which the body and the individual particles are coated and not by the vitrification of the balance of the body. Phosphates, generally, vitrify at lower temperatures than do silicates. Consequently, the glaze is obtained at temperatures below that at which silicates flow and the production of ceramic bodies, uniform in size and shape, is thereby made possible.

From the foregoing detailed description of the invention, it will be apparent that the novel method of producing a glaze herein disclosed is a wide application in the ceramic industry and of particular utility in the manufacture of tiles, bricks and related products. It is not intended to limit the invention to the use of soluble phosphates but to include as well any soluble salts which will have an equivalent action without impairment of the properties of the ceramic material and of the color characteristics of either the ceramic material or the inorganic coloring agents added to the ceramic material of which the ceramic body is to be formed.

Having now fully disclosed the invention, what I claim is:

1. The method of making glazed ceramic products comprising mixing a soluble phosphate and water with selected clays, said phosphate being in an amount between one-half of one percent and three percent by weight of the mix, forming from the resultant mixed mass ceramic bodies of the desired shapes, drying said bodies, and subsequently firing the same.

2. The method of making glazed ceramic products comprising making a mixture of selected clays, adding to the mixture water and a soluble phosphate, forming from the mixed mass ceramic bodies of the desired shapes, drying, and subsequently firing the same.

3. The method of making a glazed ceramic product comprising making a mix of selected clays, adding to the mix a phosphate solution to form a mixed mass, forming from the mixed mass ceramic bodies of the desired shapes, drying the ceramic bodies so formed, and subsequently firing the bodies at a temperature sufficiently high to produce a glaze.

4. The method of making a glazed ceramic product comprising making a mix of clays having selected color characteristics, adding to and mixing with the clays water and a small percentage of a soluble phosphate, forming from the mixed mass ceramic bodies of the desired shapes, drying the bodies so formed, and subsequently firing the same.

5. The method of making a glazed ceramic product, comprising making a mixture of selected clays, adding to the mixture water and a small percentage of a soluble phosphate to produce a mass suitable for pugging, pugging the mass, forming from the pugged mass ceramic bodies of the desired shapes, drying, and subsequently firing the same.

6. The method of making a glazed ceramic product, comprising drying mixing selected clays, adding to and mixing with the clays a small percentage of a soluble phosphate and sufficient water to form a plastic mass, forming from the mass ceramic bodies of the desired shapes, and subsequently firing the same.

7. The method of making a glazed ceramic product, comprising mixing selected clays with water and a small percentage of a soluble phosphate to form a mixed mass, pugging the mixed mass, drying the pugged mass, grinding the dried mass, pressing the ground mass into the desired shape, and finally firing the same.

8. The method of making glazed ceramic products, comprising grinding selected clays, mixing the ground clays with water and a soluble phosphate in a pug mill, forming from the resultant pugged batch ceramic bodies of the desired shapes, drying the shaped bodies to form thereon a coating of the phosphate, and subsequently firing the same to form a glaze.

9. The method of making a glazed ceramic product, comprising mixing selected clays with water and a soluble phosphate to form a mixed mass, forming from the mixed mass ceramic bodies having the desired shapes, covering portions of the surfaces of said bodies to prevent access of air to said portions, drying said bodies, and subsequently firing the same.

10. The method of making a glazed ceramic product, comprising dry mixing selected clays, adding to and mixing with the mixed clays water and a small percentage of a soluble phosphate to form a mixed mass, forming from the mixed mass ceramic bodies having the desired shapes, covering portions of the surfaces of said bodies to prevent access of air to said portions, drying said bodies, and subsequently firing the same.

11. The method of making a colored ceramic product having a glazed surface, comprising making a mix of clays having selected color characteristics, adding to the mix water and a soluble phosphate, forming from the resultant batch ceramic bodies of the desired shapes, drying, and finally firing the same.

12. The method of making a colored ceramic product having a glazed surface, comprising making a mix of selected clays, adding to the mix inorganic coloring matter, water and a small percentage of a soluble phosphate to form a mixed mass, forming from the mixed mass ceramic bodies of the desired shapes, drying, and subsequently firing the same.

13. The method of making a vari-colored ceramic body having a glazed surface comprising separately mixing clays having selected color characteristics, adding to all of said separate mixes of clays sufficient water to form separate plastic masses, and to one of said mixes a small percentage of a soluble phosphate, mixing said separate masses into a ceramic batch, forming from the batch ceramic bodies of the desired shapes, drying, and subsequently firing the same.

14. The method of making a vari-colored ceramic body having a glazed surface, comprising separately mixing clays having selected color characteristics, adding to all of said separate mixes of clays sufficient water to form separate plastic masses, and to some of said mixes a small percentage of a soluble phosphate, mixing said separate masses into a ceramic batch, forming from the batch ceramic bodies of the desired shapes, drying, and subsequently firing the same.

15. The method of making a glazed ceramic product, comprising making the mix of selected clays, adding to and mixing with the mixed clays water in which is dissolved a soluble phosphate to form a mixed mass, said phosphate being in an amount between one-half of one per cent and three per cent by weight of the mix, forming from the mixed mass ceramic bodies of the desired shapes, drying, and finally firing the same.

16. The method of making glazed ceramic products, comprising making a mix of selected clays and a soluble phosphate, adding to and mixing with the mix water to form a mixed mass, forming the mixed mass into the desired shapes, drying, and subsequently firing the same.

DONALD E. LOWER.